(12) United States Patent
DeHart

(10) Patent No.: US 11,035,503 B2
(45) Date of Patent: Jun. 15, 2021

(54) THREADED CONNECTION WITH VOID

(71) Applicant: Marubeni-Itochu Tubulars America Inc., Houston, TX (US)

(72) Inventor: Cody Allen DeHart, Cypress, TX (US)

(73) Assignee: MARUBENI-ITOCHU TUBULARS AMERICA INC., Houston, TX (US)

( * ) Notice: Subject to any disclaimer, the term of this patent is extended or adjusted under 35 U.S.C. 154(b) by 388 days.

(21) Appl. No.: 16/216,249

(22) Filed: Dec. 11, 2018

(65) Prior Publication Data

US 2019/0211952 A1 Jul. 11, 2019

Related U.S. Application Data

(60) Provisional application No. 62/615,281, filed on Jan. 9, 2018.

(51) Int. Cl.
| | | |
|---|---|---|
| *F16L 15/06* | (2006.01) | |
| *E21B 17/042* | (2006.01) | |
| *F16L 15/00* | (2006.01) | |
| *F16B 7/18* | (2006.01) | |
| *B33Y 80/00* | (2015.01) | |

(52) U.S. Cl.
CPC ............ *F16L 15/06* (2013.01); *E21B 17/042* (2013.01); *F16B 7/182* (2013.01); *F16L 15/001* (2013.01); *B33Y 80/00* (2014.12)

(58) Field of Classification Search
CPC ......... F16L 15/06; F16L 15/001; F16B 7/182; E21B 17/042
USPC ........................................................ 285/334
See application file for complete search history.

(56) References Cited

U.S. PATENT DOCUMENTS

| | | | | |
|---|---|---|---|---|
| 4,494,777 A | * | 1/1985 | Duret ................... | F16L 15/004 285/55 |
| 5,419,595 A | * | 5/1995 | Yamamoto ............ | E21B 17/042 285/334 |
| 5,829,797 A | * | 11/1998 | Yamamoto ............ | F16L 15/001 285/333 |

(Continued)

FOREIGN PATENT DOCUMENTS

| | | |
|---|---|---|
| WO | 3516161 A1 | 6/1995 |
| WO | 2018226924 A1 | 12/2018 |

OTHER PUBLICATIONS

Cody Allen Dehart, "Compression Resistant Threaded Conncection", filed Jun. 4, 2018.

(Continued)

*Primary Examiner* — David Bochna
(74) *Attorney, Agent, or Firm* — Bracewell LLP; Constance G. Rhebergen; Kevin R. Tamm

(57) ABSTRACT

A threaded connection including a pin with a plurality of pin threads, the plurality of threads comprising a plurality of pin crests and pin roots; and a box with a plurality of box threads, the box threads comprising a plurality of box crests and box roots, where the plurality of box roots and the plurality of pin crests are parallel to a horizontal axis, and where the plurality of pin roots are parallel to and collinear with a pin root taper plane, the pin root taper plane being not parallel to the horizontal axis creating at least one void space upon make-up of the threaded connection between the plurality of pin crests and the plurality of box roots, and at least one void space upon make-up between the plurality of pin roots and box crests.

17 Claims, 3 Drawing Sheets

(56) References Cited

U.S. PATENT DOCUMENTS

| | | |
|---|---|---|
| 9,670,741 B2 | 6/2017 | Dehart |
| 2007/0176423 A1* | 8/2007 | Reynolds, Jr. ........ F16L 15/004 |
| | | 285/334 |
| 2010/0123311 A1 | 5/2010 | Church |
| 2014/0312615 A1 | 10/2014 | Holland |
| 2015/0167869 A1 | 6/2015 | Dehart |
| 2016/0161030 A1* | 6/2016 | Liu ........................ F16L 15/06 |
| | | 285/390 |

OTHER PUBLICATIONS

International Search Report and Written Opinion for related PCT application PCT/IB2019/000059 dated Jun. 4, 2019.

* cited by examiner

THREADED CONNECTION WITH VOID

PRIORITY

This application is a non-provisional application of and claims priority to and the benefit of U.S. Prov. Pat. App. Ser. No. 62/615,281, filed Jan. 9, 2018, the entire disclosure of which is incorporated here by reference.

FIELD

The present technology relates to threaded connections for pipes. More particularly, the present technology relates to threaded connections for pipes that carry oil and gas and involving thread compounds or dope resulting in a tighter connection.

BACKGROUND

Pipes used, for example, in oilfield pipelines or down-hole applications, have been joined end-to-end to transport oil and other fluids from place to place. In some instances, the ends of the pipes are joined by threading together the male ends of pipes, known as a pin, with a separate coupling into which two pins are disposed (known as the box). In other connections, pipe-to-pipe connections are made with a pin being disposed on one end of a pipe and a box being disposed on another end of another pipe.

There are a number of different types of connections for pipes used in pipelines. Some connections are known as integral flush connections, wherein the connection is machined into the pipe body, without adding any additional material, or up-setting, when joining the two pieces of pipe. The result is a connection having an outer diameter that is flush with the outer diameter of the pipes, and an inner diameter that is flush with the inner diameter of the pipes. Most integral flush connections have a tension efficiency of about 68% to about 72%.

In certain types of threaded connections, thread compound or dope will be squeezed from pipe threads as they are coupled or screwed together, and it has no place to be disposed once a connection is made-up. This causes a false torque shoulder to appear, for example, on a make-up graph.

SUMMARY

Disclosed herein are threaded connections which allow thread compound or dope to be disposed within a void between threads. Thread designs of the present disclosure are not limited to one type of connection, and can be used on threaded and coupled designs as well as integral designs, being flush and semi-flush. Thread designs of the present disclosure can also be used in combination with or without seals for either premium or semi-premium connections. For example purposes here, thread designs are shown on a threaded and coupled (TNC) semi-premium connection.

In embodiments of the present disclosure, connections do not require a torque shoulder to obtain a positive torque stop like in many standard threaded connections. This property allows for greater performance throughout the connection from axial loads to torque. As noted previously, in certain types of threaded connections, thread compound or dope will be squeezed from pipe threads and it has no place to be disposed once a pipe connection is made-up, and this causes a false torque shoulder to appear, for example, on a make-up graph. Later, the thread compound will work its way out and the threaded connection will become loose and could back out down-hole causing a failure.

Embodiments of connections disclosed here apply geometries which allow thread compound and dope to be disposed into a void existing within pipe threads upon make-up, which allows the threads to properly engage causing an accurate engagement/shoulder of the threads every time, which in turn leads to a tight connection which is safe to run downhole, for example in oil and gas drilling and production operations.

Therefore, disclosed here is a threaded connection including a pin with a plurality of pin threads, the plurality of pin threads comprising a plurality of pin crests and plurality of pin roots and a box with a plurality of box threads, the box threads comprising a plurality of box crests and plurality of box roots, where the plurality of box roots and the plurality of pin crests are parallel to a horizontal axis, and where the plurality of pin roots are parallel to and collinear with a pin root taper plane, the pin root taper plane being not parallel to the horizontal axis, creating at least one void space upon make-up of the threaded connection between the plurality of pin crests and the plurality of box roots, and at least one void space upon make-up between the plurality of pin roots and the plurality of box crests.

In some embodiments, the width of pin crests of the plurality of pin crests increases and the width of pin roots of the plurality of pin roots decreases from an internal connection end of the pin to an external connection end of the pin. In other embodiments, the width of box crests of the plurality of box crests increases, and the width of box roots of the plurality of box roots decreases, from an external connection end of the box to an internal connection end of the box. In certain embodiments, the width of the pin crests increases by about 0.01" each rotation, and the width of the pin roots decreases by about 0.01" each rotation from the internal connection end of the pin to the external connection end of the pin.

Still in other embodiments, the width of the box crests increases by about 0.01" each rotation, and the width of the box roots decreases by about 0.01" each rotation, from an external connection end of the box to an internal connection end of the box. In yet other embodiments, the pin root taper plane is offset from the horizontal axis at between about 1 degree and about 6 degrees. In some embodiments, void space upon make-up between the plurality of pin roots and the plurality of box crests is substantially disposed proximate load flanks of the pin threads and box threads.

In some embodiments, box crests of the plurality of box crests proximate an external connection end of the box are substantially parallel to the pin root taper plane and pin roots of the plurality of pin roots, and wherein box crests of the plurality of box crests proximate an internal connection end of the box are substantially parallel to a horizontal axis increasing the volume of more than one void space upon make-up between the plurality of pin roots and the plurality of box crests proximate the internal connection end of the box. In certain embodiments, upon make-up of the threaded connection doping is disposed substantially within void spaces proximate the internal connection end of the box.

Still in other embodiments, the width of pin crests of the plurality of pin crests increases and the width of pin roots of the plurality of pin roots decreases from an internal connection end of the pin to an external connection end of the pin. In certain embodiments, the width of box crests of the plurality of box crests increases, and the width of box roots of the plurality of box roots decreases, from an external connection end of the box to an internal connection end of the box.

Still in some other embodiments, box crests of the plurality of box crests proximate an external connection end of the box are substantially parallel to the pin root taper plane and pin roots of the plurality of pin roots causing interference upon make-up of the threaded connection, and wherein box crests of the plurality of box crests proximate an internal connection end of the box are substantially parallel to a horizontal axis along a length of about 40% to about 60% of a respective pin root, increasing the volume of more than one void space upon make-up between the plurality of pin roots and the plurality of box crests proximate the internal connection end of the box.

In certain embodiments of the threaded connection, upon make-up of the threaded connection doping is disposed substantially within void spaces proximate the internal connection end of the box. In some embodiments, the width of pin crests of the plurality of pin crests increases and the width of pin roots of the plurality of pin roots decreases from an internal connection end of the pin to an external connection end of the pin. In still other embodiments, the width of box crests of the plurality of box crests increases, and the width of box roots of the plurality of box roots decreases, from an external connection end of the box to an internal connection end of the box.

In certain other embodiments, the plurality of box crests and plurality of pin crests exemplify negative load flank angles from about negative 1 degree to about negative 20 degrees toward an external connection end of the pin and an external connection end of the box. Still in other embodiments, parallel void space volume between the plurality of pin crests and box roots decreases from an external connection end of the box and pin to an internal connection end of the box and pin, and void space volume between the plurality of box crests and plurality of pin roots increases from the external connection end of the box and pin to the internal connection end of the box and pin.

BRIEF DESCRIPTION OF THE DRAWINGS

The present technology will be better understood on reading the following detailed description of nonlimiting embodiments thereof, and on examining the accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION OF THE EMBODIMENTS

Figure 1:
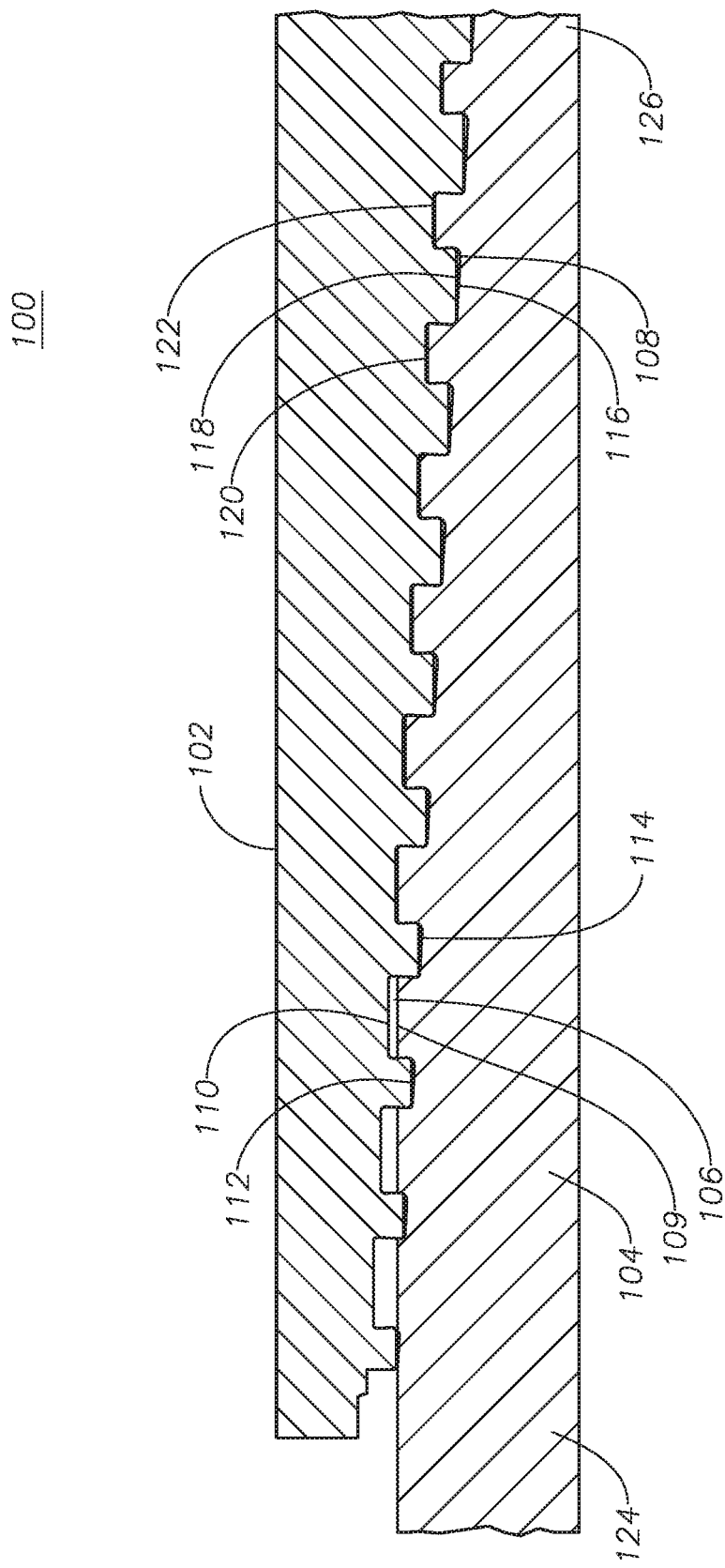
FIG. 1 is a perspective view of a threaded connection on a semi-premium connection according to an embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the embodiments are not intended to be limited to the specific terms used, and it is to be understood that each specific term includes equivalents that operate in a similar manner to accomplish a similar purpose.

Referring first to FIG. 1, a perspective view is shown of a threaded connection on a semi-premium connection according to an embodiment of the present technology. In other embodiments for direct pipe-to-pipe connections, the components of a "box" discussed here throughout can be disposed directly on another pipe as the female part of a pipe connection. Connection 100 of FIG. 1 includes a box 102 and a pin 104. As shown, upon make-up of connection 100, voids 106, 108, for example, exist between the box 102 and the pin 104. As shown, void 106 exists and is disposed between a pin crest 109 and a box root 110 from and between box crest 112 to box crest 114. Void 108 exists and is disposed between pin root 116 and box crest 118 along a portion of the length between pin crest 120 and pin crest 122. Voids, such as for example voids 106, 108, can exist for every thread, every other thread, or any number of threads in a connection, depending on the thread compound or dope to be disposed in such voids upon make-up. The size, shape, and volume of the voids can be the same for each thread or vary between threads.

Figure 2:
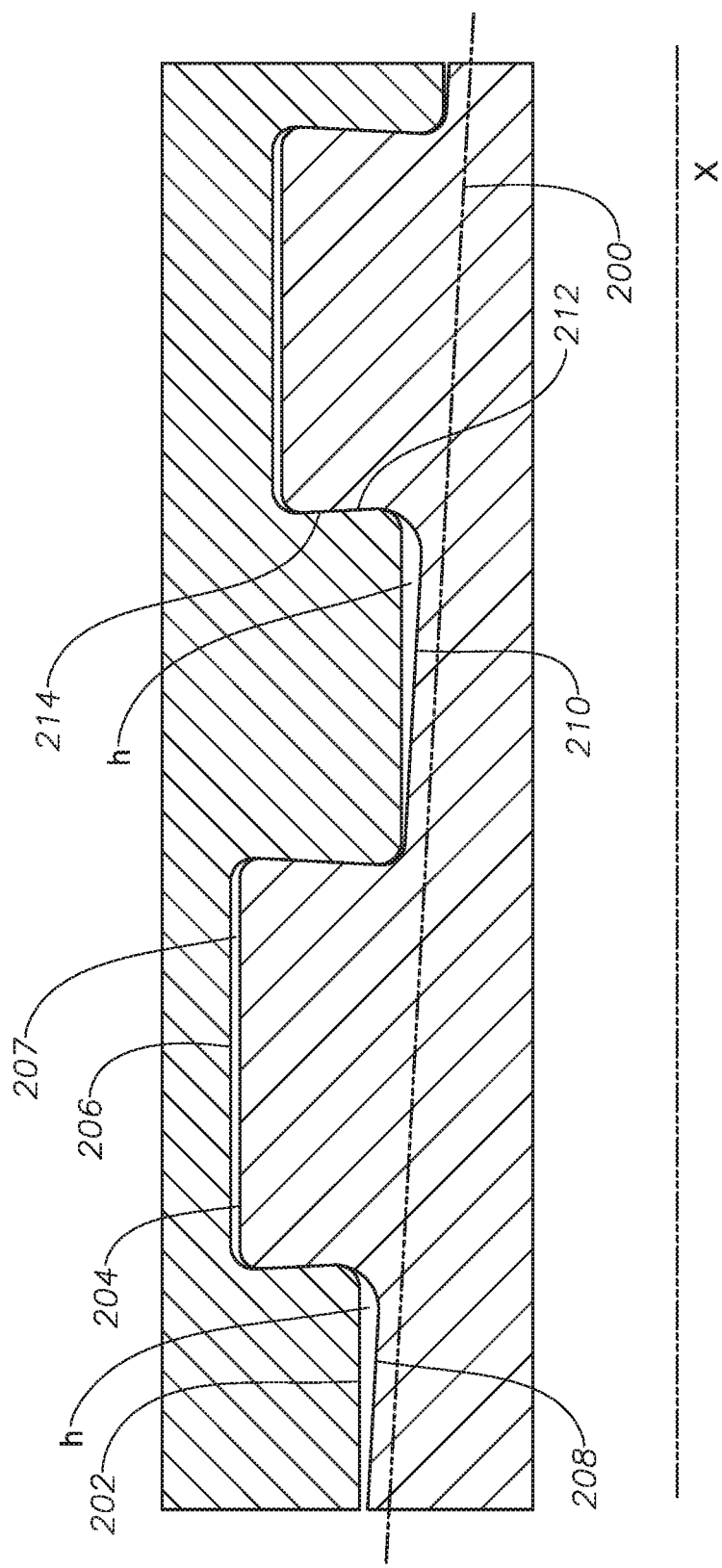
FIG. 2 is a close-up perspective view of the threaded connection of FIG. 1.

FIG. 2 is a close-up perspective of the threaded connection of FIG. 1. FIG. 2 includes a horizontal axis X and a pin root taper plane 200. In the example embodiment provided, all box crests, such as for example box crest 202, all pin crests, such as for example pin crest 204, and all box roots, such as for example box root 206, are substantially parallel to the horizontal axis X. Pin roots, such as for example pin roots 208, 210 run substantially parallel to and collinear with the pin root taper plane 200. In some embodiments, pin root taper plane 200 proceeds at an angle between about 1 degree and about 6 degrees from the horizontal axis X. In other embodiments, some, but not all, box crests are parallel to a horizontal axis X, while other box crests or portions of box crests follow an angled pin root taper plane, such as for example pin root taper plane 200.

The disclosed alignments of the box crests, box roots, pin crests, and pin roots allows, for example, a gap of about 0.010 inch from the box crest to the pin root at its lowest point, shown as "h" in FIG. 2. This occurs proximate the load flanks of the pin crests and box crests, for example load flanks 212, 214. A horizontal void 207 parallel with the horizontal axis X exists between pin crest 204 and box root 206 along the length of pin crest 204 and box root 206. As noted, such voids can exist at every thread, every other thread, or any number of threads depending on the connection to be made up. Voids may exist either or both between pin roots and box crests and pin crests and box roots.

Figure 3A:
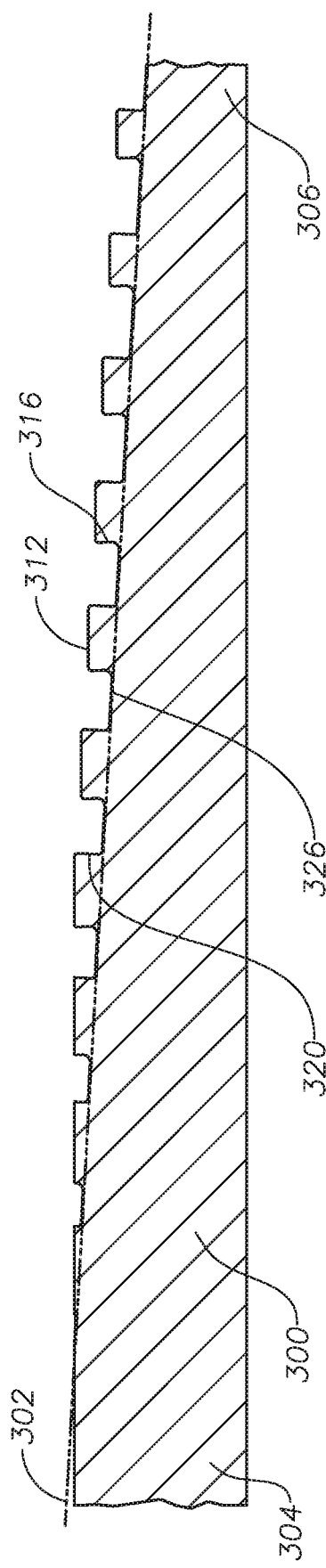
FIG. 3A is a perspective view of a pin in an embodiment of a connection of the present disclosure.

The size of a gap between a box root and pin crest or between a box crest and pin root can vary based on the thread size of the connection. FIG. 3A is a perspective view of a pin in an embodiment of a connection of the present disclosure. Referring to FIG. 3A, on pin 300 the threads change in size moving along pin root taper plane 302 from left to right (external connection end of the pin 304 to the internal connection end of the pin 306). As shown, the pin crests 312 decrease in horizontal width and the pin roots 326 increase in width along the pin root taper plane 302 moving along the pin root taper plane 302 from left to right.

At the insertion face of the pin (internal connection end of the pin 306), the pin crests 312 are shorter or narrower in width along horizontal axis x, and the pin roots 326 are wider along the pin root taper plane. In the embodiment shown, every revolution of the pin root, proceeding from right to left along pin root taper plane 302, decreases by about 0.01" horizontally, causing the pin crests 312 to increase by about 0.01" horizontally. This pattern continues until the threads run out and there is no more material to cut. In other embodiments, every revolution of the pin roots 326, proceeding from right to left along pin root taper plane, decreases by about between 0.001" and 0.1", causing the pin crests 312 to increase by about between 0.001" and 0.1". This pattern continues until the threads run out and there is no more material to cut. Pin roots, pin crests, box roots, and box crests of the present disclosure can be fashioned either or both on the end of a pipe or box by any suitable method of additive or subtractive manufacture, such as for example with the use of a Computer Numerical Control (CNC) machine or 3-D printing.

Figure 3B:
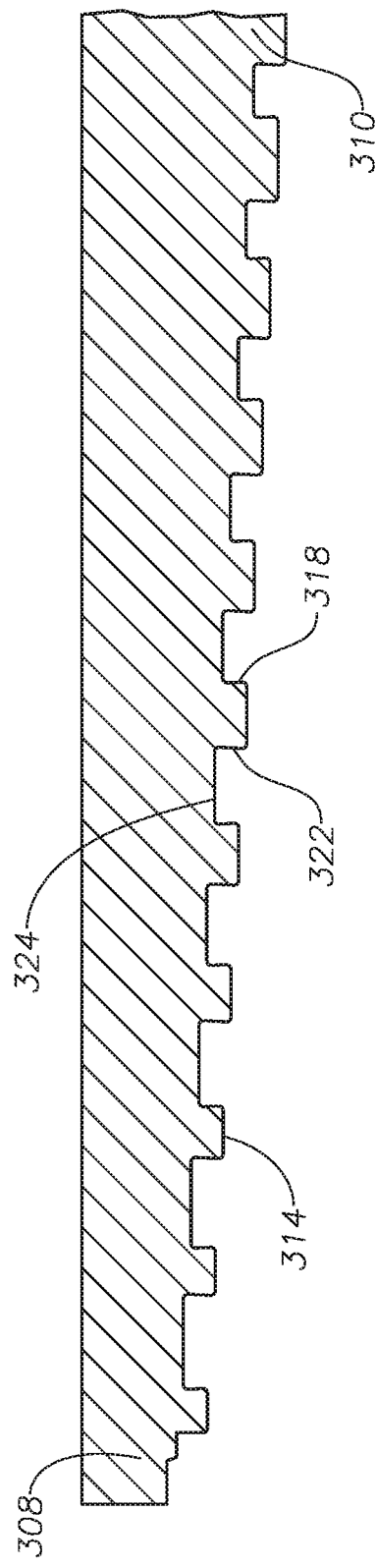
FIG. 3B is a perspective view of a box in an embodiment of a connection of the present disclosure.

Referring to FIG. 3B, the box threads are designed similarly to the pin threads of FIG. 3A. Starting from the left face of the box (the external connection end of the box 308), the box crests 314 are relatively shorter in width, and the box roots 324 have a relatively larger width. As the threads move along the taper, from left to right toward the internal connection end of the box 310, the box crest width increases by about 0.01" and the box root width decreases by about 0.01" in each revolution. In other embodiments, the variation of threads can vary in each rotation from between about 0.001" to about 0.1".

Still referring to FIGS. 3A and 3B, the pin crests and box crests, such as pin crests 312 and box crests 314, both have load flanks that exemplify negative load flank angles, for example at load flank angles 316, 318; the angles can range from about negative 1 degree to about negative 20 degrees toward the external connection end of the pin 304 and the external connection end of the box 308. This relationship is also shown in FIG. 2 at for example load flanks 212, 214. The relationship between the load flank and stab flank angle can vary on the pin and/or box.

The pin stab flank, for example stab flank 320, contacts the box stab flank, for example stab flank 322; this angle can be the same or different than the load flank angle, but facing toward the internal connection end of the pin 306 and the internal connection end of the box 310, but the difference between the load flank and stab flank angles from a vertical 90° axis should not exceed a difference of about 2 degrees. Pin crests 312 and box thread roots 324 are parallel to the horizontal axis and shall not contact each other, in some embodiments, for example as also shown in FIG. 2 at pin crest 204 and box root 206. Pin root 326 proceeds at substantially the same angle as pin root taper plane 302.

The taper angle of pin root taper plane 302 can vary depending on a product line; a general range would be from about 1 degree to 6 degrees from the horizontal. In some embodiments, box crests exhibit a unique form not parallel with a horizontal axis. For example, at the external end of a connection, a box crest can generally match the angle of the pin root and pin root taper plane and can be from about 1 degree to about 6 degrees from the horizontal. The pin root and box crest will have interference in this section to build radial inference which will create torque.

The entirety of box crests through the connection need not be parallel to the pin roots; in certain box crests, a box crest length corresponding to anywhere from about 40% to about 60% of the pin root width will exhibit a different angle and become parallel to the horizontal axis enabling a partial void space between the box crest and pin root, the void space volume increasing from an external end of the connection to an internal end of the connection. For example, this is shown in FIG. 1 with little to no void space between box crests and pin roots at the external end of the connection 124, and closer to internal end of the connection 126, void 108 exists between pin root 116 and box crest 118.

This change in geometry forms a void allowing excessive thread compound to be moved into those voids. Such a design provides ample radial interference approaching the external end of a connection to mitigate the risk of the connection backing off, and provides an advantageous amount of load flank contact between the load flanks of the box threads and pin threads (see FIGS. 1 and 2 for example). Geometries of the present disclosure also allow the box crest to drop down which increases the stab flank length from an external end of the box toward the internal end of the box. This allows for easier stabbing with a hard stop which will lead to easier and faster make ups. Void space volumes of the present disclosure are located largely proximate the load flank side as opposed to the stab flank side. The radius between the pin load flank and the pin root will be a relatively large radius to reduce peak stresses.

Although the technology herein has been described with reference to particular embodiments, it is to be understood that these embodiments are merely illustrative of the principles and applications of the present technology. It is therefore to be understood that numerous modifications can be made to the illustrative embodiments and that other arrangements can be devised without departing from the spirit and scope of the present technology as defined by the appended claims. Accordingly, the scope of the present disclosure should be determined by the following claims and their appropriate legal equivalents.

Although the disclosure has been described with respect to certain features, it should be understood that the features and embodiments of the features can be combined with other features and embodiments of those features.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed throughout as from about one particular value, and to about another particular value. When such a range is expressed, it is to be understood that another embodiment is from the one particular value and to the other particular value, along with all combinations within said range.

As used throughout the disclosure and in the appended claims, the words "comprise," "has," and "include" and all grammatical variations thereof are each intended to have an open, non-limiting meaning that does not exclude additional elements or steps.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

While the disclosure has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present disclosure may suitably comprise, consist or consist essentially of the elements disclosed and may be practiced in the absence of an element not disclosed.

What is claimed is:

1. A threaded connection comprising:
   a pin with a plurality of pin threads, the plurality of pin threads comprising a plurality of pin crests and plurality of pin roots; and
   a box with a plurality of box threads, the box threads comprising a plurality of box crests and plurality of box roots,
   where the plurality of box roots and the plurality of pin crests are parallel to a horizontal axis, and where the plurality of pin roots are parallel to and collinear with a pin root taper plane, the pin root taper plane being not parallel to the horizontal axis, creating at least one void space upon make-up of the threaded connection between the plurality of pin crests and the plurality of box roots, and at least one void space upon make-up between the plurality of pin roots and the plurality of box crests.

2. The threaded connection of claim 1, wherein the width of pin crests of the plurality of pin crests increases and the width of pin roots of the plurality of pin roots decreases from an internal connection end of the pin to an external connection end of the pin.

3. The threaded connection of claim 2, wherein the width of box crests of the plurality of box crests increases, and the width of box roots of the plurality of box roots decreases, from an external connection end of the box to an internal connection end of the box.

4. The threaded connection of claim 3, wherein the width of the pin crests increases by about 0.01" each rotation, and the width of the pin roots decreases by about 0.01" each rotation from the internal connection end of the pin to the external connection end of the pin.

5. The threaded connection of claim 4, wherein the width of the box crests increases by about 0.01" each rotation, and the width of the box roots decreases by about 0.01" each rotation, from an external connection end of the box to an internal connection end of the box.

6. The threaded connection of claim 1, wherein the pin root taper plane is offset from the horizontal axis at between about 1 degree and about 6 degrees.

7. The threaded connection of claim 6, wherein box crests of the plurality of box crests proximate an external connection end of the box are substantially parallel to the pin root taper plane and pin roots of the plurality of pin roots, and wherein box crests of the plurality of box crests proximate an internal connection end of the box are substantially parallel to a horizontal axis increasing the volume of more than one void space upon make-up between the plurality of pin roots and the plurality of box crests proximate the internal connection end of the box.

8. The threaded connection of claim 7, wherein upon make-up of the threaded connection doping is disposed substantially within void spaces proximate the internal connection end of the box.

9. The threaded connection of claim 8, wherein the width of pin crests of the plurality of pin crests increases and the width of pin roots of the plurality of pin roots decreases from an internal connection end of the pin to an external connection end of the pin.

10. The threaded connection of claim 9, wherein the width of box crests of the plurality of box crests increases, and the width of box roots of the plurality of box roots decreases, from an external connection end of the box to an internal connection end of the box.

11. The threaded connection of claim 1, wherein void space upon make-up between the plurality of pin roots and the plurality of box crests is substantially disposed proximate load flanks of the pin threads and box threads.

12. The threaded connection of claim 6, wherein box crests of the plurality of box crests proximate an external connection end of the box are substantially parallel to the pin root taper plane and pin roots of the plurality of pin roots causing interference upon make-up of the threaded connection, and wherein box crests of the plurality of box crests proximate an internal connection end of the box are substantially parallel to a horizontal axis along a length of about 40% to about 60% of a respective pin root, increasing the volume of more than one void space upon make-up between the plurality of pin roots and the plurality of box crests proximate the internal connection end of the box.

13. The threaded connection of claim 12, wherein upon make-up of the threaded connection doping is disposed substantially within void spaces proximate the internal connection end of the box.

14. The threaded connection of claim 13, wherein the width of pin crests of the plurality of pin crests increases and the width of pin roots of the plurality of pin roots decreases from an internal connection end of the pin to an external connection end of the pin.

15. The threaded connection of claim 14, wherein the width of box crests of the plurality of box crests increases, and the width of box roots of the plurality of box roots decreases, from an external connection end of the box to an internal connection end of the box.

16. The threaded connection of claim 1, wherein the plurality of box crests and plurality of pin crests exemplify negative load flank angles from about negative 1 degree to about negative 20 degrees toward an external connection end of the pin and an external connection end of the box.

17. The threaded connection of claim 1, wherein parallel void space volume between the plurality of pin crests and box roots decreases from an external connection end of the box and pin to an internal connection end of the box and pin, and wherein void space volume between the plurality of box crests and plurality of pin roots increases from the external connection end of the box and pin to the internal connection end of the box and pin.

* * * * *